United States Patent [19]

Swearingen et al.

[11] Patent Number: 4,515,938

[45] Date of Patent: May 7, 1985

[54] HYDROXYSTYRYLAZAPOLYMERS

[75] Inventors: Loren L. Swearingen, Clute; Randy J. LaTulip, Lake Jackson, both of Tex.

[73] Assignee: The Dow Chemical Company, Midland, Mich.

[21] Appl. No.: 588,597

[22] Filed: Mar. 12, 1984

[51] Int. Cl.$^3$ .................. C08G 12/28; C08G 12/26
[52] U.S. Cl. .................. 528/252; 428/290; 523/222; 524/542; 528/248
[58] Field of Search .............. 528/248, 252; 428/290; 524/542; 523/222

[56] References Cited

U.S. PATENT DOCUMENTS

| | | | |
|---|---|---|---|
| 2,379,691 | 7/1945 | D'Alelio | 528/252 |
| 2,749,324 | 6/1956 | Walter | 528/252 |
| 3,994,862 | 11/1976 | Ropers et al. | 260/67.5 |
| 4,016,325 | 4/1977 | Flautt et al. | 428/290 X |
| 4,163,740 | 8/1979 | Malassine et al. | 260/31.2 N |
| 4,199,643 | 4/1980 | Falgiatore et al. | 428/290 |
| 4,362,860 | 12/1982 | Ratto et al. | 528/248 |

OTHER PUBLICATIONS

Yan, Doctor of Philosophy Thesis, approved 3-18-1983, Polytechnic Institute of New York.
R. Franke, Chemische Berichte, vol. 38, pp. 3724–3728, (1905).
W. Bramsch, Chemische Berichte, vol. 42, pp. 1193–1197, (1909).
Chiang et al., J. Organic Chem., vol. 10, pp. 21–25, (1945).
Yan et al., Organic Coatings and Applied Polymer Sci. Proc., vol. 46, (Mar. 25–Apr. 2, 1982), pp. 482–488.

Primary Examiner—Lucille M. Phynes
Attorney, Agent, or Firm—B. G. Colley

[57] ABSTRACT

Heat resistant thermosetting prepolymers are prepared by reacting one or more methylated pyridines or pyrazines with one or more hydroxy aromatic aldehydes. The total number of methyl groups on the pyridine or pyrazine can vary from 2 to 4. The prepolymers are cured to produce heat resistant polymers and laminates with conventional fibers such as carbon fibers.

17 Claims, No Drawings

HYDROXYSTYRYLAZAPOLYMERS

BACKGROUND OF THE INVENTION

This invention relates to thermosetting polymers prepared from methylated pyridines or pyrazines and hydroxy aromatic mono-aldehydes.

In the aerospace and/or aircraft industry there is a need for light weight fire resistant polymeric composites for interior and exterior use. A recent development in this critical area was the discovery that composites based on polystyrylpyridines are useful in this field of endeavor. The key patents are outlined below.

It is known from U.S. Pat. No. 3,994,862 that polystrylpyridine thermosetting prepolymers and cured polymers can be obtained by reacting methylated pyridines and aromatic dialdehydes.

U.S. Pat. No. 4,163,740 discloses the preparation of solutions of polystyrlpyridines in various organic solvents such as ethyl acetate, propanol, and methylethylketone.

U.S. Pat. No. 4,362,860 discloses related polystyrylpyridines terminated with vinyl pyridine.

Bramsch, Chemische Berichte 42:1193-97 (1909) discloses the reaction of methylated pyridines and salicylaldehyde to prepare monomeric hydroxy methyl stilbazoles.

Franke, Chemische Berichte 38:3724-28 (1905) discloses the reaction of methylated pyrazines with salicylaldehyde to prepare related monomeric compounds.

Related monomeric stilbazole compounds are also disclosed by Chiang et al. J. Org. Chem. 10:21-25 (1945). In each of these articles there is no disclosure of polymers.

SUMMARY OF THE INVENTION

It now has been found that heat resistant thermosetting prepolymers and cured polymers can be prepared by reacting one or more hydroxy aromatic aldehydes and one or more aza compounds having the formula

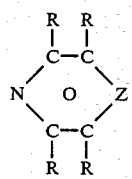

where Z is N, C—CH$_3$, C—CH$_2$—CH$_3$ or C—H
R is hydrogen, methyl, or ethyl,
whereby the total number of methyl groups substituted on the ring is in the range from 2-4.

These hydroxystyrylazapolymers are useful to make high temperature resistant composites with fiber glass, carbon fibers and the like. The advantage of this invention is that the polymers and composites made herein are based on the use of a cheaper (or more readily available) raw material i.e. hydroxy aromatic monoaldehydes. Hence, the compositions of this invention can be prepared for less cost and one can still obtain the same or better fire resistant properties as the prior art compositions. Furthermore, the hydroxy aldehydes are more reactive and provide a faster cure time.

DESCRIPTION OF THE PREFERRED EMBODIMENTS

The prepolymers of this invention are prepared by reacting alkylated azine compounds such as methyl pyridines and methyl pyrazines with hydroxy aromatic aldehydes in the presence of an acidic catalyst.

The azine compounds and the aldehydes are heated to a temperature in the range from about 130° to about 230° C., preferably in the range from 170° to 190° C. for a period of time from 0.5 to 6 hours and preferably 1 to 2 hours. The reaction is conducted in the absence of oxygen and suitably with a nitrogen purge.

Useful catalysts that can be used are sulfuric acid, hydrochloric acid, ZnCl$_2$, acetic anhydride, AlCl$_3$, toluene disulfonic acid, trichloro acetic acid, and acetic acid. The catalysts are used in amounts from 0.5 to 20 weight percent based on the total weight of the reactants and preferably in amounts from 2 to 5 weight percent. It is to be understood that the reaction can proceed in the absence of catalyst but the reaction time is much longer.

Examples of useful pyridines are 2,3-dimethyl pyridine, 2,4-dimethyl pyridine, 2,5-dimethyl pyridine, 2,6-dimethyl pyridine, 3,4-dimethyl pyridine, 3,5-dimethyl pyridine, 3,5-dimethyl-2-ethyl pyridine, 2,3,4,6-tetramethyl pyridine, 2,3,5-trimethyl pyridine, 2,3,6-trimethyl pyridine, 2,4,5-trimethyl pyridine and 2,4,6-trimethyl pyridine.

Examples of useful hydroxy aromatic aldehydes are 2-hydroxy benzaldehyde, 3-hydroxy benzaldehyde and 4-hydroxy benzaldehyde.

Examples of useful pyrazines are 2,5-dimethyl pyrazine, 2,3-dimethyl pyrazine, 2,5-dimethyl pyrazine, 2,3,5-trimethyl pyrazine and 2,3,5,6-tetramethyl pyrazines.

It is to be understood that the foregoing reactants can be used alone or in combination as in an initial mixture of each or by the sequential addition during the reaction to achieve beneficial results.

The molar ratio range of the hydroxy aromatic aldehyde to the azine compounds can be from about 0.5:1 to about 6:1 and preferably in the range of 1:1 to 3:1.

The prepolymer (oligomer or resin) initially obtained is cured by press molding at a temperature range of about 180° to 300° C. for a time of 1 to 8 hours. The resultant semicured polymer is further cured at a temperature range of about 250° to 300° C. for a time of 2 to 10 hours to obtain the final fire resistant molding.

Composites are made by adding fibers to the prepolymer before the press molding. Examples of useful fibers to be used herein are graphite fibers, fiber glass, aramid fibers, asbestos fibers, and the like.

The following examples are presented to further illustrate but not limit the invention.

EXAMPLE 1

In a 2 liter resin kettle equipped with a stirrer, thermometer, nitrogen purge, and reflux condenser, there was introduced 640.0 grams of 4-hydroxybenzaldehyde (5.25 moles) and 668.9 grams of 2,4,6-trimethylpyridine (5.53 moles). This represents 5.34 mole % excess 2,4,6-trimethylpyridine based on a 1/1 reactant mole ratio. The catalyst, 19.0 grams of concentrated sulfuric acid, was then added, and the reaction mixture was heated from 170° C. to 190° C. for three hours. Water, a product of the reaction, that escaped through the reflux condenser was condensed in another condenser and collected.

When allowed to cool to ambient temperature, the reaction product solidified to a dark, maroon-colored, hard and brittle solid. The reaction product is believed to be an oligomeric mixture based on the adduct of the benzaldehyde with 4-hydroxystyryl dimethylpyridine. This material has a softening point of about 150° C. and is soluble in a solution of about 90% tetrahydrofuran and 10% water. The material has a yellow-orange color when ground to a powder.

The reaction product was oven-cured under full vacuum at 150° C. for three hours, followed by an additional three hours of curing at 200° C. and ambient pressure. The resulting product was ground to a powder and washed with copious quantities of methanol.

The methanol-washed reaction product had a melting point range of 200° C. to 220° C.

IR Analysis: Throughout the course of the reaction the carbonyl absorption band (1670 cm$^{-1}$) was seen to decrease. This was accompanied by an increase in the trans-unsaturation absorption band (970 cm$^{-1}$) due to the condensation reaction.

The powdered reaction product was set by press-molding at 250° C. for 2 hours followed by an additional 2 hours at 280° C. The resulting mold was post-cured for 16 hours at 250° C.

Following are the properties of the neat molded polymer:

Glass Transition Temperature (Tg)=360° C.
Thermo Gravimetric Analysis in nitrogen (TGA)=1% weight loss at 300° C. 2% weight loss at 400° C. and 46% weight loss at 1000° C.

EXAMPLE 2

In a 500-ml glass resin kettle, equipped identically as the kettle described in Example 1, there was introduced 378.9 grams of 4-hydroxybenzaldehyde (3.11 moles), and 187.9 grams of 2,4,6-trimethylpyridine (1.55 moles). The reaction mixture was heated and agitated until a homogenous mixture resulted. Then, 6.32 ml of concentrated sulfuric acid was added (equivalent to 2.0 weight % of total reactants). This mixture was reacted for four hours over a temperature range of 165° C. to 195° C. The resulting product was a viscous, maroon-colored liquid. The reaction product is believed to be an oligomeric mixture based on bis(4-hydroxy styryl)methyl pyridine. When allowed to cool to ambient temperature, a very hard and brittle solid formed. The properties of the product are Melting Point Range=115° C. to 130° C.
Elemental Weight % Analysis=75.9% carbon, 4.0% nitrogen, 5.6% hydrogen.
IR Spectrum Analysis: The product totally lacked the aldehyde peak (1670 cm$^{-1}$), thus indicating that the hydroxybenzaldehyde was totally reacted. This is an advantage over PSP. As expected, trans-unsaturation absorption bands were found to be present (970 cm$^{-1}$). Aromatic carbon-oxygen bonds were also determined to exist (1250 cm$^{-1}$) due to the phenolic groups.

EXAMPLE 3

In a 1000 ml resin kettle with a nitrogen purge there was introduced 504.3 grams of salicylaldehyde (4.13 moles), 176.2 grams of 2,4,6-trimethyl pyridine (1.45 moles) and 14.0 grams of sulfuric acid. The mixture was heated from 170° C. to 190° C. for five hours. Water, the volatile condensation byproduct, was collected overhead during the course of the reaction.

The color and composition of the reaction mixture varied from a clear, thin liquid at the start of the reaction to a maroon, viscous liquid at reaction termination. After cooling to ambient temperature, the reaction product turned to a hard, brittle solid. The reaction product is believed to be an oligomeric mixture based on 2,4,6-tris(2-hydroxystyryl)pyridine. The softening point of the product was 115° C. to 120° C. When ground to a fine powder, the product exhibits a very bright yellow-orange color. Infrared analysis of the reaction product shows a dramatic decrease in the carbonyl absorption peak (C=O at 1670 cm$^{-1}$) with a corresponding increase in the trans-unsaturation absorption peak (—C=C— at 970 cm$^{-1}$).

In order to remove unreacted salicylaldehyde and 2,4,6-trimethyl pyridine the powder was washed with copious quantities of acetone. The resulting solids were dried in a vacuum oven for 2 hours at 100° C. The melting point of the dried product was found to be 240° C. Infrared analysis of this product revealed trace quantities of carbonyl (aldehyde at 1670 cm$^{-1}$) existing in the prepolymer. The trans-unsaturation absorption peak (970 cm$^{-1}$) remained unchanged.

The above mentioned dried product was then press molded at 280° C. for 2 hours. The resulting molded product had physical characteristics identical to those of Example 1. The product was a very dark and hard solid.

EXAMPLE 4

588 grams (4.85 moles) of 2,4,6-trimethylpyridine (TMP) were added to a 2 liter reactor having a nitrogen purge along with 26 grams of ZnCl$_2$. This was heated to the reflux point and 887 grams (7.26 moles) of p-hydroxybenzaldehyde (PHB) were added in seven increments over a period of 110 minutes. The reaction temperature was maintained in the range from 145° to 149° C. during this time. After addition of all the PHB the temperature was raised to 160° C. After four hours (with stirring) at this temperature, 560 grams of 2,6-dimethyl pyridine (DMP) were added. Water of condensation was collected as an azeotrope with the methyl pyridines using a side arm and condenser off of a reflux column. After 150 ml of distillate had been collected, another 150 ml of fresh 2,6-dimethyl pyridine was added to the reaction mixture. In both cases the reaction mixture was cooled below the boiling point of the DMP before it was added. The final mole ratio of TMP:PHB:DMP was approximately 1:1.5:1. The reaction was run for four hours at 160° C. after the initial addition of the DMP. At this point the reaction mixture was very viscous and stirring was slow and difficult.

When cooled, the product was the color and consistency of dark caramel. The product proved to be soluble in acetone, methanol, tetrahydrofuran and methylethylketone. It was completely insoluble in water.

Purification was accomplished by dissolving the material in methanol and then adding water to precipitate out the reaction product. This material was filtered, washed with hot water and dried. The resulting orange powder had a melting range of 148°–165° C. IR analysis of the powder showed no residual aldehyde at 1670 cm$^{-1}$. This material was press molded into a thermosetting polymer. Thermo Gravimetric Analysis of the cured polymer showed a 45% weight loss in nitrogen at 1000° C.

EXAMPLE 5

2,3,5,6-tetramethylpyrazine (204 grams, 1.5 moles) and p-hyroxybenzaldehyde (733 grams, 6 moles) were added to a 2 liter resin kettle having a nitrogen purge. After complete dissolution, sulfuric acid (15.12 grams, 0.15 moles) was added to the reactor contents. The temperature was maintained between 176°–198° C. After 3 hours, 4 minutes, the viscosity reached 740 centipoise. A dark hard glossy solid was obtained after the reactor contents were cooled to room temperature. The solid was crushed to give a violet powder with a mortar and pestle. The violet prepolymer was dissolved in methanol. The methanolic solution of prepolymer was added to water which caused the prepolymer to precipitate. The precipitate was dried, crushed, redissolved in methanol, precipitated in water, and dried overnight at 120° C. in a vacuum oven. The dried prepolymer was a light brown colored powder. The prepolymer melted between 177°–192° C. It was compression molded at 255°–290° C. and 490 psi for 2 hours to give a cured black polymer with the following properties:

Glass transition temperature=430°–440° C. (determined by DSC)

weight loss in nitrogen @ 950° C.=38.5%

This polymer was post cured in an oven for 15 hours at 280° C. which increased the glass transition temperature to 460° C. and decreased the weight loss in nitrogen at 950° C. to 31.8%.

EXAMPLE 6

Using the same procedure of Example 5, 270.3 grams of 2,5-dimethyl pyrazine was reacted with 610.6 grams of 4-hydroxybenzaldehyde to prepare a dark brown prepolymer.

EXAMPLE 7

Approximately 30 grams of the prepolymer prepared as described in example 2 was dissolved in 30 cc of acetone in a shallow pan. Ten 3"×3" (7.6×7.6 cm) sections of glass fiber mat were dipped in this prepolymer and acetone solution and then dryed in an oven at 150° C. and a high vacuum for 1.5 hours. After vacuum drying, the ten glass fiber prepregs were layed up on top of one another and then compression molded at 260° C. and 400 psi (28.1 kg/cm²) for 3 hours. The finished composite had thoroughly fused giving a flexible sample after trimming.

We claim:

1. A thermosetting prepolymer which comprises the resinous reaction product of one or more hydroxy aromatic aldehydes and a compound having the formula

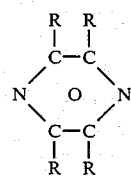

where R is hydrogen, methyl, or ethyl, whereby the total number of methyl groups substituted on the ring is in the range from 2–4.

2. The prepolymer of claim 1 wherein said compound is 2,5-dimethyl pyrazine, 2,3,5,6-tetramethyl pyrazine, or a mixture thereof.

3. The prepolymer of claim 1 wherein said aldehyde is 4-hydroxy benzaldehyde.

4. The prepolymer of claim 1 wherein said aldehyde is 2-hydroxy benzaldehyde.

5. A cured polymer which comprises the product obtained by curing the prepolymer of claims 1, 2, 3 or 4 at a temperature in the range from about 180° to about 300° C. for a time sufficient to obtain a cure.

6. A cured fibrous laminate made with the resinous reaction product of one or more hydroxy aromatic aldehydes and one or more azine compounds having the formula

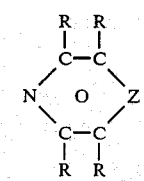

where Z is N, C—CH$_3$, C—CH$_2$—CH$_3$ or C—H,

R is hydrogen, methyl, or ethyl, whereby the total number of methyl groups substituted on the ring is in the range from 2–4.

7. The laminate of claim 6 wherein said azine compound is 2,4,6-trimethyl pyridine, 2,6-dimethyl pyridine, or a mixture thereof.

8. The laminate of claim 6 wherein said azine compound is 2,5-dimethyl pyrazine, 2,3,5,6-tetramethyl pyrazine, or a mixture thereof.

9. The laminate of claim 6 wherein said aldehyde is 4-hydroxy benzaldehyde.

10. The laminate of claim 6 wherein said aldehyde is 2-hydroxy benzaldehyde.

11. The fibrous laminate of claim 6 wherein the fibers are selected from the group consisting of graphite fibers, fiber glass, aramid fibers, and asbestos fibers.

12. A cured fibrous laminate made with the resinous reaction product of one or more hydroxy aromatic aldehydes and a methyl pyridine compound selected from the group consisting of 2,4,6-trimethyl pyridine, 2,6-dimethyl pyridine, and mixtures thereof wherein the fibers are selected from the group consisting of graphite fibers, fiber glass, aramid fibers, and asbestos fibers.

13. The laminate of claim 12 wherein said aldehyde is 4-hydroxy benzaldehyde.

14. The laminate of claim 12 wherein said aldehyde is 2-hydroxy benzaldehyde.

15. A cured fibrous laminate made with the resinous reaction product of one or more hydroxy aromatic aldehydes and a methyl pyrazine selected from the group consisting of 2,5-dimethyl pyrazine, 2,3,5,6-tetramethyl pyrazine, or mixtures thereof wherein the fibers are selected from the group consisting of graphite fibers, fiber glass, aramid fibers, and asbestos fibers.

16. The laminate of claim 15 wherein said aldehyde is 4-hydroxy benzaldehyde.

17. The laminate of claim 15 wherein said aldehyde is 2-hydroxy benzaldehyde.

* * * * *